(12) United States Patent
Lam

(10) Patent No.: US 8,046,529 B2
(45) Date of Patent: Oct. 25, 2011

(54) UPDATING CONTROL INFORMATION IN NON-VOLATILE MEMORY TO CONTROL SELECTION OF CONTENT

(75) Inventor: Johnny A. Lam, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 12/238,177

(22) Filed: Sep. 25, 2008

(65) Prior Publication Data

US 2010/0077131 A1    Mar. 25, 2010

Related U.S. Application Data

(60) Provisional application No. 61/029,976, filed on Feb. 20, 2008.

(51) Int. Cl.
*G06F 12/00* (2006.01)
(52) U.S. Cl. ......................... 711/103; 711/154
(58) Field of Classification Search .................. 711/103
See application file for complete search history.

(56) References Cited

U.S. PATENT DOCUMENTS

| | | |
|---|---|---|
| 2005/0286336 A1 | 12/2005 | Harari et al. |
| 2007/0061504 A1 | 3/2007 | Lee |
| 2007/0171728 A1 | 7/2007 | Cho |
| 2007/0192532 A1 | 8/2007 | Ogle |
| 2007/0233940 A1 | 10/2007 | Chu |

OTHER PUBLICATIONS

Wikipedia, "Flash Memory," pp. 1-12 (as least as early as Jan. 19, 2008).
Datalight Inc., "NAND vs. NOR flash—Tradeoffs and Strategies," inuxDevices.com, pp. 1-5 (Nov. 23, 2005).

*Primary Examiner* — John Lane

(57) ABSTRACT

To control selection of content in a non-volatile memory, control information is stored in the non-volatile memory, where the control information is to control selection of content in the non-volatile memory. An algorithm is used to update the control information in the non-volatile memory to cause different content in the non-volatile memory to be selected, wherein the algorithm sets the control information to an initial value that enhances use of programming of the non-volatile memory to update the control information, and reduces use of erasing of the non-volatile memory to update control information.

20 Claims, 2 Drawing Sheets

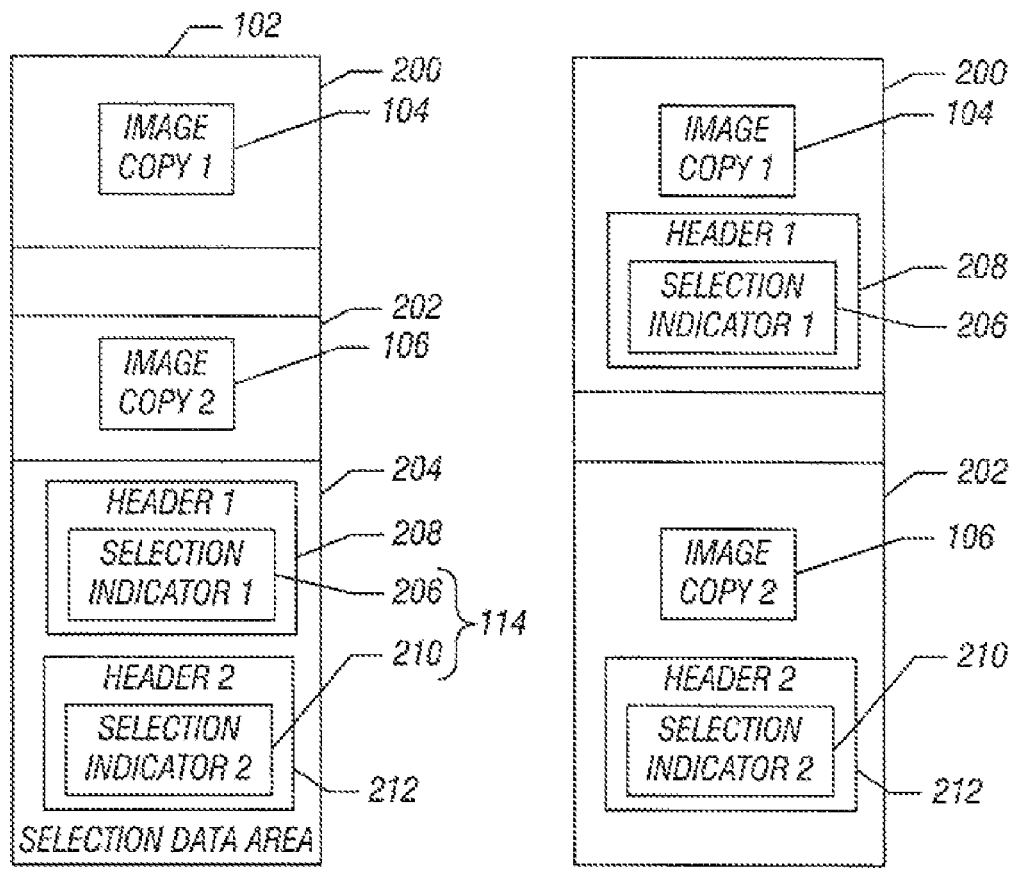
FIG. 2
FIG. 3
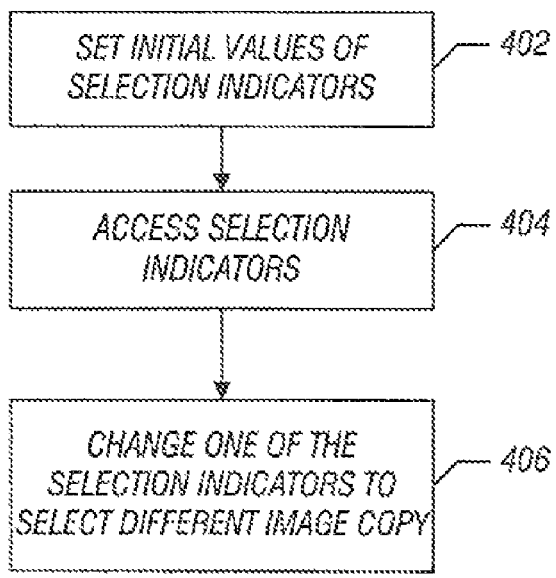
FIG. 4

UPDATING CONTROL INFORMATION IN NON-VOLATILE MEMORY TO CONTROL SELECTION OF CONTENT

CROSS REFERENCE TO RELATED APPLICATIONS

This Application claims the benefit of U.S. Provisional Application Ser. No. 61/029,976, filed Feb. 20, 2008, titled "UPDATING CONTROL INFORMATION IN NON-VOLATILE MEMORY TO CONTROL SELECTION OF CONTENT" which is hereby incorporated by reference herein as if reproduced in full below.

BACKGROUND

In many types of systems, non-volatile memory devices are used to store data and/or software code. Examples of non-volatile memory devices include flash memory, electrically erasable and programmable read-only memory, and so forth.

An issue associated with certain types of non-volatile memory devices (such as flash memories) is that data bits in these non-volatile memory devices can be programmed (or written) to change states in just one direction (e.g., from a "1" state to a "0" state). The data bits of such non-volatile memory devices cannot be programmed (or written) to change states in the opposite direction (e.g., from a "0" state to a "1" state). To change back from a "0" state to a "1" state, an erase operation would have to be performed. However, an erase operation typically involves the erasing of a block of data at one time. In contrast, programming (or writing) the non-volatile memory can be performed on a byte-by-byte (or word-by-word) basis. A block is usually much larger than a byte or word.

As a result, updating the content of certain types of non-volatile memory devices can be inefficient, since an erase operation may have to be first performed before updated content can be written to the non-volatile memory.

BRIEF DESCRIPTION OF THE DRAWINGS

Some embodiments of the invention are described, by way of example, with respect to the following figures:

FIGS. 2 and 3 illustrate different arrangements of content in the non-volatile memory, where the content can be updated according to an embodiment; and FIG. 4 is a flow diagram of a process of updating content of a non-volatile memory, according to an embodiment.

DETAILED DESCRIPTION

Figure 1:
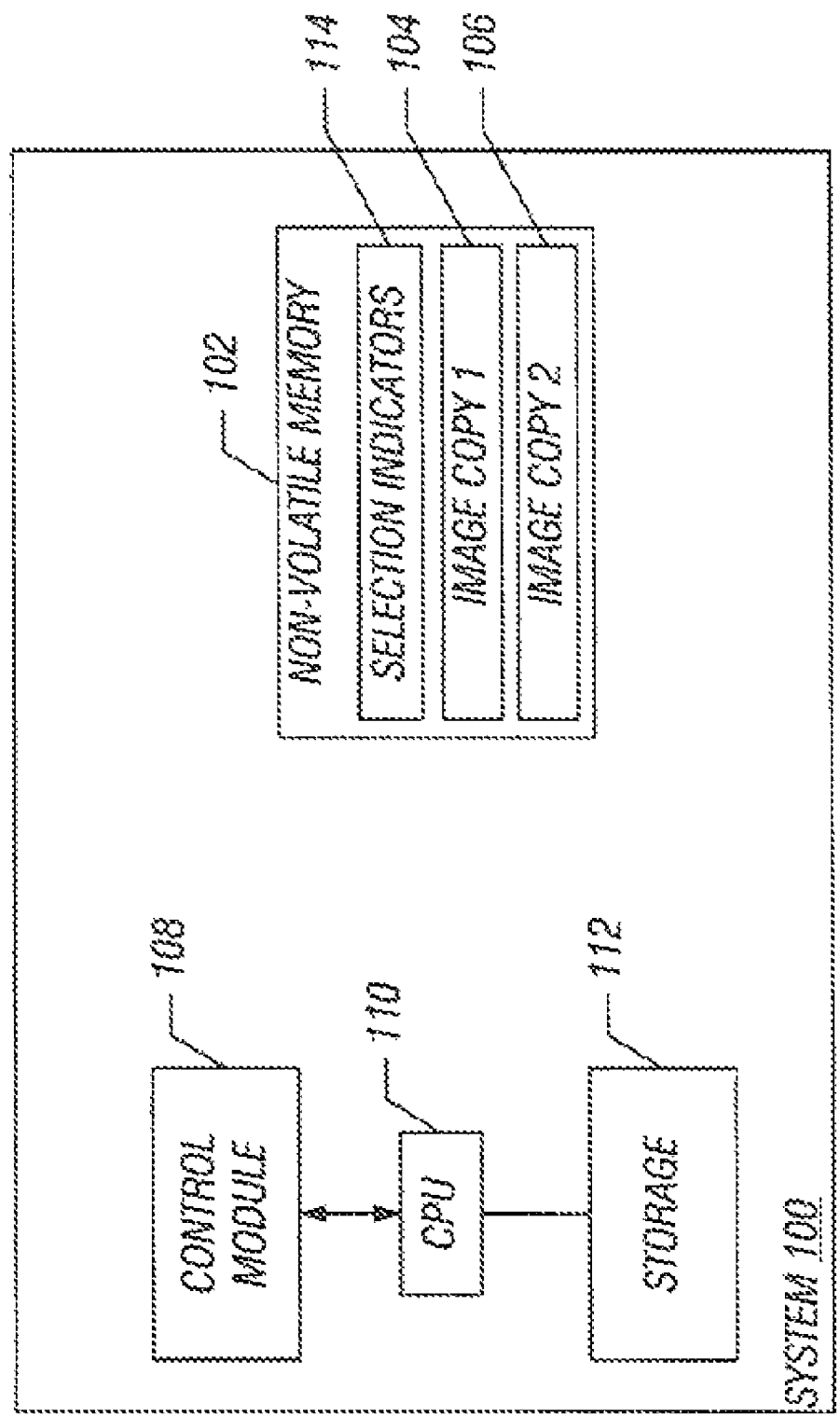
FIG. 1 is a block diagram of an example system that includes a non-volatile memory and a control module to control update of content of the non-volatile memory, in accordance with an embodiment.

In accordance with some embodiments, to control selection from among different content in a non-volatile memory, control information that is also stored in the non-volatile memory is updated (modified). The update of the control information uses an algorithm that enhances (e.g., maximizes) the use of programming (writing), and reduces (e.g., minimizes) the use of erasing, to update the control information in the non-volatile memory. In one embodiment, the algorithm sets the control information to an initial value that allows programming (or writing) to change selected bits of the control information, without having to first erase a block of the non-volatile memory that contains the control information. The terms "program" and "write" are used interchangeably, and are intended to refer to applying an input data value to the non-volatile memory to be stored into the non-volatile memory.

Examples of the non-volatile memory include flash memory, electrically erasable and programmable read-only memory (EEPROM), and so forth. A characteristic of the non-volatile memory is that the non-volatile memory is able to maintain its content even if power is removed from the non-volatile memory.

Performing an erase operation in a non-volatile memory is relatively inefficient, since an erase operation often erases an entire block of the non-volatile memory, where a block can be a relatively large portion in the non-volatile memory. Instead, by using programming to update the control information, a more efficient technique is provided to update the control information for selecting different content in the non-volatile memory. For example, programming of data in the non-volatile memory can be performed on a byte-by-byte (or word-by-word) basis, where a byte or word is often much smaller than a block involved in an erase operation.

FIG. 1 shows an example system 100 that includes a non-volatile memory 102. The system 100 can be any one of various types of systems, such as a computer, a handheld device, a communications device, a switch, a storage controller, and so forth.

The non-volatile memory 102 is able to store multiple copies (104, 106) of an image. The image copies 104, 106 are examples of the different content noted above that can be selected by updating control information in the non-volatile memory. An "image" refers to any collection of data, such as user data, application data, software code, and so forth. As one example, the image can be a basic input/output system (BIOS) software code that is executed by the system 100 during a boot sequence of the system 100. As other examples, the image can be a database table, a document, and so forth.

Multiple copies 104, 106 of the image are kept in the non-volatile memory 102 for any one or more of the following reasons: (1) to provide fault tolerance so that the system 100 can continue to operate even if one of the copies becomes corrupted or unavailable, (2) to allow for updates to one of the image copies while system operation can proceed using the other copy, or (3) for other purposes.

During operation, one of the image copies 104, 106 is selected for use. Although just two copies are depicted in FIG. 1, it is noted that more than two copies of an image can be maintained in the non-volatile memory 102 in other implementations. Also, although reference is made to "copies" of the image, note that the copies of the image do not have to be exact duplicates, but can be different versions of the image. For example, one copy may be a corrupted or modified version of the image, while another copy may be a non-corrupted or non-modified version.

In accordance with some embodiments, a control module 108 is provided in the system 100 to control selection of one of the image copies 104, 106 to use during system operation. The control module 108 can be a software module executable on one or more central processing units (CPUs) 110 in the system 100. Alternatively, the control module 108 can be a hardware module, such as a microcontroller, an application specific integrated circuit (ASIC), a programmable gate array, and so forth. As further depicted in FIG. 1, the CPU(s) 110 is (are) connected to a storage 112, which can be implemented with disk media, for example.

A characteristic of the non-volatile memory 102 is that data bits stored in the non-volatile memory 102 can be selectively programmed to change states in a single particular direction (such as from a "1" state to a "0" state). Typically, a non-volatile memory can be selectively programmed one byte (or one word) at a time. In other implementations, a non-volatile memory can be programmed on a bit-by-bit basis. However, the data bits of the non-volatile memory 102 cannot be selectively programmed in the opposite direction (e.g., from a "0" state to a "1" state). To change data bits from a "0" to a "1" state, for example, an erase operation would have to be performed with respect to the non-volatile memory 102. An erase operation causes an entire block of the non-volatile memory 102 to be erased, with the block being a relatively large portion (usually much larger than a byte or word) of the non-volatile memory.

To control which of the image copies 104, 106 to use during system operation, the control module 108 is able to adjust values of selection indicators 114, which are also stored in the non-volatile memory 102. The selection indicators 114 are examples of the control information noted above that can be updated to control selection from among different content in the non-volatile memory.

Note that due to the constraint of being able to selectively program data bits in just one direction, the control module 108 employs an algorithm according to some embodiments to efficiently update the selection indicators 114 for controlling selection of the image copies 104, 106, where the update of the selection indicators 114 can be performed in a manner that enhances use of programming operations and reduces use of erase operations.

Generally, the selection indicators 114 include a first selection indicator for the first image copy (104) and a second selection indicator for the second image copy (106). The control module 108 can set initial values of the selection indicators to some relatively high value, such as all 1s. Then, to update a selection indicator, the control module 108 is able to selectively write 0s to selected bits of the selection indicator. In this way, the selection indicator is modified to change which of the image copies 104, 106 to use during system operation. Thus, assuming in one example that a selection indicator is a one byte value, the selection indicator can have an initial value of 11111111. Then, to update the selection indicator, byte programming can be performed to change the value to 11111110, in which the last bit has been changed from a "1" to a "0."

In the example above, it is assumed that the selection indicators start at a high value because of the constraint that selective programming of data bits can be performed from a "1" state to a "0" state, but not from a "0" state to a "1" state. In a different embodiment, the non-volatile memory 102 can be constrained such that a data bit can be programmed from a "0" state to a "1" state, but not vice versa. In such alternative embodiment, the starting values of the selection indicators 114 would be a low value, such as all 0s.

FIG. 2 shows one example arrangement of content in the non-volatile memory 102, which has a first area 200 to store the first image copy 104, a second area 202 to store the second image copy 106, and a selection data area 204 to store the selection indicators 114. In FIG. 2, the selection indicators 114 include a first selection indicator 206 in a first header 208 associated with the first image copy 104, and a second selection indicator 210 in a second header 212 associated with the second image copy 106. Each of the headers 208 and 212 contains other information in addition to the selection indicators, such as information pertaining to the size of the corresponding image, a checksum value and/or a cyclic redundancy code (CRC) to enable error detection and/or correction, and so forth.

The control module 108 of FIG. 1 can update the selection indicators 206 and 210 based on which of the image copies 104, 106 are to be used during system operation. The update of the selection indicators 206, 210 can be done in a manner that starts at corresponding initial values of the selection indicators 206, 210, and progressively continues to smaller values based on programming.

For example, assuming that each of the selection indicators 206 and 210 has a one-byte length, then the starting value of each selection indicator can have a value as high as 11111111. In one example, the selection indicator 206 can have an initial starting value of 11111111, while the selection indicator 210 can have a starting initial value of 11111110. It is assumed that the image copy selected for use during system operation is the image copy associated with the lower selection indicator value. In this example, the image copy selected would be the second image copy 206, since the selection indicator 210 has a lower value than selection indicator 206.

If the control module 108 later decides that the first image copy 104 is to be used during system operation, then the control module 108 would update the first selection indicator 206 as follows: 11111101. In this example, the next to the last bit (the second least significant bit) of the first selection indicator 206 is written to the "0" value by performing selective programming of the non-volatile memory. Since the first selection indicator 206 now has the lower value, the first image copy 104 is selected for use. However, if the control module 108 subsequently decides that the second image copy 106 is to be used during system operation, then the control module 108 would program the second selection indicator 210 as follows: 11111011. In this case, the third least significant bit of the selection indicator 210 has been changed from a "1" state to a "0" state. As a result, since the second selection indicator 210 has the lower value, the system will use the second first image copy 106 during system operation.

The progressive reduction of the selection indicator values can continue until no further programming can be performed (in other words, in one example, the most significant bit of one of the selection indicators has a "0" value). In this case, an erase operation would have to be performed to reset the selection indicator value, such as to all "1"s.

FIG. 3 shows a different arrangement of the content of the non-volatile memory. Whereas the headers 208 and 212 in FIG. 2 are provided in a separate selection data area 204, the headers 208 and 210 (and the selection indicators 206, 210 in the corresponding headers 208, 210) in FIG. 3 are stored in the same corresponding areas 200 and 202 of the non-volatile memory 102 as the corresponding image copies 104, 106. The FIG. 3 arrangement of content is slightly less efficient than the FIG. 2 arrangement, since if an erase operation has to be performed, then the corresponding image copy would have to be erased along with the header. In contrast, in the FIG. 2 arrangement, the separate selection data area 204 allows for the headers 208, 212 (or just one of the headers) to be erased without having to erase the corresponding image copy(ies).

FIG. 4 is a flow diagram of a process of controlling selection of which of plural copies of an image is to be used during system operation. The process of FIG. 4 can be performed by the control module 108 of FIG. 1. The control module 108 sets (at 402) initial values for the selection indicators 206, 210 according to an algorithm that addresses the constraint of the non-volatile memory that allows programming to change data states in just one direction (e.g., from "1" to "0"). This algorithm defines the initial values such that use of programming to update the selection indicators is enhanced, while use of erasing is reduced. To update the selection indicators 206, 210, the control module 108 accesses (at 404) the selection indicators stored in the non-volatile memory 102 that correspond to the copies of the image. Based on which image copy is to be used, the control module 108 changes (at 406) the corresponding selection indicator, by performing a write of one or more data bits of the corresponding selection indicator in the particular direction (e.g., from a "1" state to a "40" state).

Instructions of software described above (including control module 108 of FIG. 1) are loaded for execution on a processor (such as one or more CPUs 110 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of controlling selection of content in a non-volatile memory, comprising:
    storing control information in the non-volatile memory, the control information to control selection of content in the non-volatile memory; and
    using an algorithm to update the control information in the non-volatile memory to cause different content in the non-volatile memory to be selected, wherein the algorithm sets the control information to an initial value that enhances use of programming of the non-volatile memory to update the control information, and reduces use of erasing of the non-volatile memory to update control information.

2. The method of claim 1, wherein using the algorithm comprises:
    setting the control information in the non-volatile memory to the initial value to cause selection of first content in the non-volatile memory; and
    changing the control information in the non-volatile memory to a second value to cause selection of second content in the non-volatile memory.

3. The method of claim 1, wherein storing the control information comprises storing a first selection indicator associated with first content in the non-volatile memory, and storing a second selection indicator associated with second content in the non-volatile memory,
    wherein updating the control information comprises updating at least one of the first and second selection indicators.

4. The method of claim 1, wherein the different content in the non-volatile memory comprises plural copies of an image in the non-volatile memory, wherein updating the control information causes different ones of the plural image copies to be selected.

5. The method of claim 4, wherein updating the control information to select different ones of the plural image copies comprises updating the control information to select different ones of the plural copies of the image that includes software code.

6. The method of claim 1, wherein storing the control information in the non-volatile memory comprises storing the control information in flash memory.

7. The method of claim 1, further comprising storing the different content in corresponding different areas of the non-volatile memory,
    wherein storing the control information comprises storing the control information in another area that is separate from the areas used to store the different content.

8. The method of claim 1, further comprising storing the different content in different areas of the non-volatile memory,
    wherein storing the control information comprises storing first control information associated with first content in a first area of the non-volatile memory, and storing second control information associated with second content in a second area of the non-volatile memory.

9. The method of claim 1, wherein data portions in the non-volatile memory are selectively programmable to change in a single direction from a first state to a second state, and wherein data in the non-volatile memory is erasable one block at a time to change in an opposite direction from the second state to the first state,
    wherein a block is larger than each of the data portions.

10. An article comprising at least one storage medium containing instructions that when executed cause a computer to:
    store selection indicators associated with corresponding plural copies of an image in a non-volatile memory, wherein the non-volatile memory is configured to enable writes to change data bits from a first state to a second state but not from the second state to the first state;
    set the selection indicators in the non-volatile memory to have different initial values to cause selection of one of the plural copies to use; and
    program the value of at least one of the selection indicators to cause selection of a different one of the plural copies to use.

11. The article of claim 10, wherein the instructions when executed cause the computer to use an algorithm to update the selection indicators that enhances use of programming operations and reduces use of erase operations.

12. The article of claim 10, wherein the first state is a "1" state, and the second state is a "0" state, and wherein setting the selection indicators to the initial values comprises setting the selection indicators to have initially high values to enable use of programming, and not erasing, of the selection indicators to change the states of the selection indicators.

13. The article of claim 10, wherein storing the indicators comprises storing the indicators in an area of the non-volatile memory separate from areas storing the plural copies of the image.

14. The article of claim 10, wherein the image comprises software code.

15. The article of claim 10, wherein the image comprises basic input/output system (BIOS) code.

16. The article of claim 10, wherein the instructions when executed cause the computer to:

compare the values of the selection indicators to determine which of the image copies to use during operation of the computer.

17. The article of claim 16, wherein the instructions when executed cause the computer to:
use the image copy with a lower selection indicator value during the operation of the computer.

18. A computer comprising:
a non-volatile memory to store at least first content and second content; and
a control module to:
store control information in the non-volatile memory, the control information to control selection between the first and second content in the non-volatile memory; and
use an algorithm to update the control information in the non-volatile memory to select a different one of the first and second content in the non-volatile memory for use during operation of the computer, wherein the algorithm sets the control information to an initial value that enhances use of programming of the non-volatile memory to update the control information, and reduces use of erasing of the non-volatile memory to update the control information.

19. The computer of claim 18, wherein the algorithm maximizes the use of programming of the non-volatile memory to update the control information, and minimizes the use of erasing of the non-volatile memory to perform to update.

20. The computer of claim 18, wherein the first content and second content comprise first and second copies of software code.

* * * * *